US006721896B1

(12) United States Patent
Bond et al.

(10) Patent No.: US 6,721,896 B1
(45) Date of Patent: Apr. 13, 2004

(54) SYSTEM AND METHOD FOR CONVERTING A SELECTED SIGNAL INTO A TIMING SIGNAL AND INSERTING THE PHASE OF THE TIMING SIGNAL INTO A FRAMED SIGNAL

(75) Inventors: John H. Bond, Plano, TX (US); Ioan V. Teodorescu, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/539,362

(22) Filed: Mar. 31, 2000

(51) Int. Cl.[7] .............................. G06F 1/04; H04J 3/06
(52) U.S. Cl. ........................ 713/500; 370/503
(58) Field of Search .................. 713/500; 370/342, 370/335, 517, 503, 509, 512, 516; 331/2; 375/354

(56) References Cited

U.S. PATENT DOCUMENTS

| | | | | |
|---|---|---|---|---|
| 4,835,491 A | * | 5/1989 | Coster | 331/2 |
| 5,426,745 A | * | 6/1995 | Baji et al. | 345/469 |
| 5,438,370 A | * | 8/1995 | Primiano et al. | 348/476 |
| 5,546,401 A | * | 8/1996 | Lee et al. | 370/517 C |
| 5,754,544 A | * | 5/1998 | Pfeiffer | 370/359 |
| 5,818,884 A | * | 10/1998 | Reymond | 375/354 |
| 5,832,036 A | * | 11/1998 | Nakamura | 375/211 |
| 6,021,110 A | * | 2/2000 | McGibney | 370/208 |
| 6,137,786 A | * | 10/2000 | Ariyoshi et al. | 370/335 |
| 6,185,247 B1 | * | 2/2001 | Williams et al. | 375/212 |
| 6,272,125 B1 | * | 8/2001 | Nomura | 370/342 |

FOREIGN PATENT DOCUMENTS

| | | | | |
|---|---|---|---|---|
| GB | 2286300 A | * | 8/1995 | H03L/7/08 |
| GB | WO 9712457 A2 | * | 4/1997 | H04L/7/00 |

OTHER PUBLICATIONS

IBM TDB, Digital Multiplexed Video and Synchronization for Pulse–Streatched Signals, Feb. 1, 1987, vol. 29 Issue 9, pp. 3780–3783.*

* cited by examiner

*Primary Examiner*—Thomas Lee
*Assistant Examiner*—Mark Connolly
(74) *Attorney, Agent, or Firm*—Baker Botts; Craig A. Hoersten; V. Lawrence Sewell (57) ABSTRACT

A system for generating a timing signal is disclosed. A processor generates a selection command. A clock receives a signal selected in response to the selection command and converts the selected signal to a timing signal. A framing module inserts a phase of the timing signal into a framed signal. A method for generating a timing signal for a telecommunication system is disclosed. A selection command is generated using a processor. A signal is selected in response to the selection command. The selected signal is converted to a timing signal using a clock. A phase of the timing signal is inserted into a framed signal using a framing module.

28 Claims, 5 Drawing Sheets

FIG. 2B
FROM FIG. 2A

SYSTEM AND METHOD FOR CONVERTING A SELECTED SIGNAL INTO A TIMING SIGNAL AND INSERTING THE PHASE OF THE TIMING SIGNAL INTO A FRAMED SIGNAL

TECHNICAL FIELD OF THE INVENTION

This invention relates generally to the field of telecommunication systems and more specifically to a method and system for generating a timing signal in a telecommunication system.

BACKGROUND OF THE INVENTION

The increasing growth of telecommunication systems has led to the demand for an improved method and system for distributing signals in a telecommunication system. Telecommunication systems distribute signals through a network to control and monitor the modules of the network. Signals distributed downstream include control commands for the downstream modules, while signals collected from the downstream modules include information about the status of the downstream modules. Telecommunication systems also distribute timing signals to synchronize the signals of a network. Telecommunication systems transmit high-speed data, and thus require dependable timing signals.

Known methods for controlling and monitoring the modules use multiple levels of processors to issue commands to and collect status information from the modules. The processors may control the modules using a series of customized commands distributed to the modules. The processors may also monitor the modules for power supply, correct hardware/software configuration, correct selection of the data and timing planes, a data parity error, a timing signal defect, and/or an application-specific error.

These methods for controlling and monitoring modules, however, may result in a constant overhead burden at each processor in the multi-level system. Processors control the downstream modules using complicated software routines. Moreover, constant status polling and error-recovery routines are required to monitor the modules. Additionally, the physical implementation of these processes involves complicated circuit modules and complex multi-wire cables or backplane busses that fan out through the multilevel system.

Known systems for providing a source for a timing signal require a user to identify incoming signals that are believed to be the best sources. To use the signals, however, the user must provide cables from the source to the timing generator, often through buildings and modules. Moreover, if a different signal is to be used, more cables must be installed by the user.

While the known approaches have provided improvements over prior approaches, the challenges in the field of telecommunication systems have continued to increase with demands for more and better techniques having greater effectiveness and efficiency. Therefore, a need has arisen for a new method and system for generating and distributing a timing signal.

SUMMARY OF THE INVENTION

In accordance with the present invention, a method and system for generating a clock signal are provided that substantially eliminate or reduce the disadvantages and problems associated with previously developed systems and methods.

According to one embodiment of the present invention, a system for generating a timing signal is disclosed. A processor generates a selection command. A clock receives a signal selected in response to the selection command and converts the selected signal to a timing signal. A framing module inserts a phase of the timing signal into a framed signal.

According to one embodiment of the present invention, a method for generating a timing signal for a telecommunication system is disclosed. A selection command is generated using a processor. A signal is selected in response to the selection command. The selected signal is converted to a timing signal using a clock. A phase of the timing signal is inserted into a framed signal using a framing module.

A technical advantage of the present invention is that a timing generator generates timing and control signals for distribution to the telecommunication system. Since the timing generator performs these operations, downstream modules do not require the complicated hardware and software needed to perform these operations. Another technical advantage of the present invention is that the control signals are distributed with a phase of the timing signal in a framed signal. Sending the control signals with the timing signals reduces the amount of hardware and software needed to distribute signals through the telecommunication system. Another technical advantage of the present invention is that the timing signal may be changed without altering the cables of the system. Consequently, the present invention results in more efficient and effective distribution of a timing signal in a telecommunication system.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

An embodiment of the present invention and its advantages are best understood by referring to FIGS. 1–5 of the drawings, like numerals being used for like and corresponding parts of the various drawings.

Figure 1A:
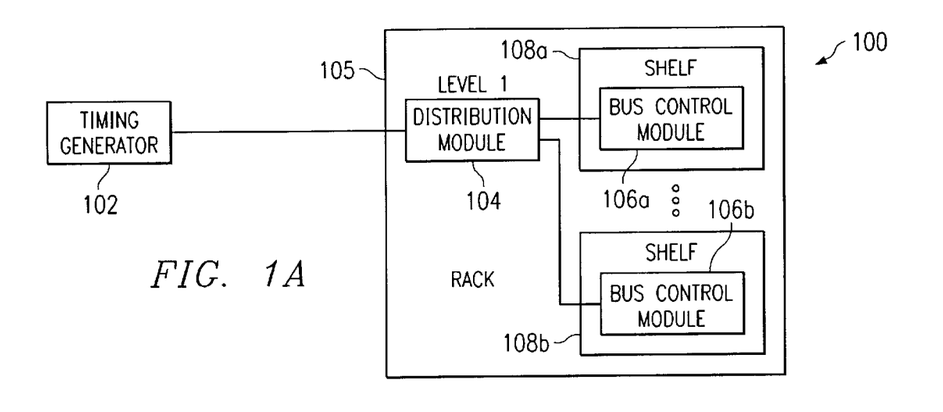
FIG. 1A is a block diagram of one embodiment of a one-level for distributing a timing signal according to the present invention.

FIG. 1A is a block diagram of one embodiment of a one-level system 100 for distributing a timing signal according to the present invention. In one embodiment, a timing generator 102 generates timing and control signals for distribution through system 100 in a framed signal, a signal with fields for transmitting data. Since timing generator 102 generates the timing and control signals, downstream modules of system 100 do not need the complicated hardware and software to perform this operation, reducing the cost and increasing the efficiency of the system.

A distribution module 104 of a rack 105 receives the framed signal from timing generator 102, and distributes the signal to bus control modules 106a–b. Bus control modules 106a–b distribute the signals to shelves 108a–b, respectively. Each shelf 108a–b may include one or more bus control modules 106a–b. The circuitry on shelves 108a–b operate using the framed signal received from bus control modules 106a–b. In one embodiment, bus control modules 106a–b receive status signals, which include status information, and derived clock signals from shelves 108a–b, respectively. Bus control modules 108a–b then transmit the status signals to distribution module 104, which transmits the signals to timing generator 102. Timing generator 102 is operable to select one of the derived clock signals received from bus control modules 106a–b to distribute to system 100 as a timing signal.

Figure 1B:
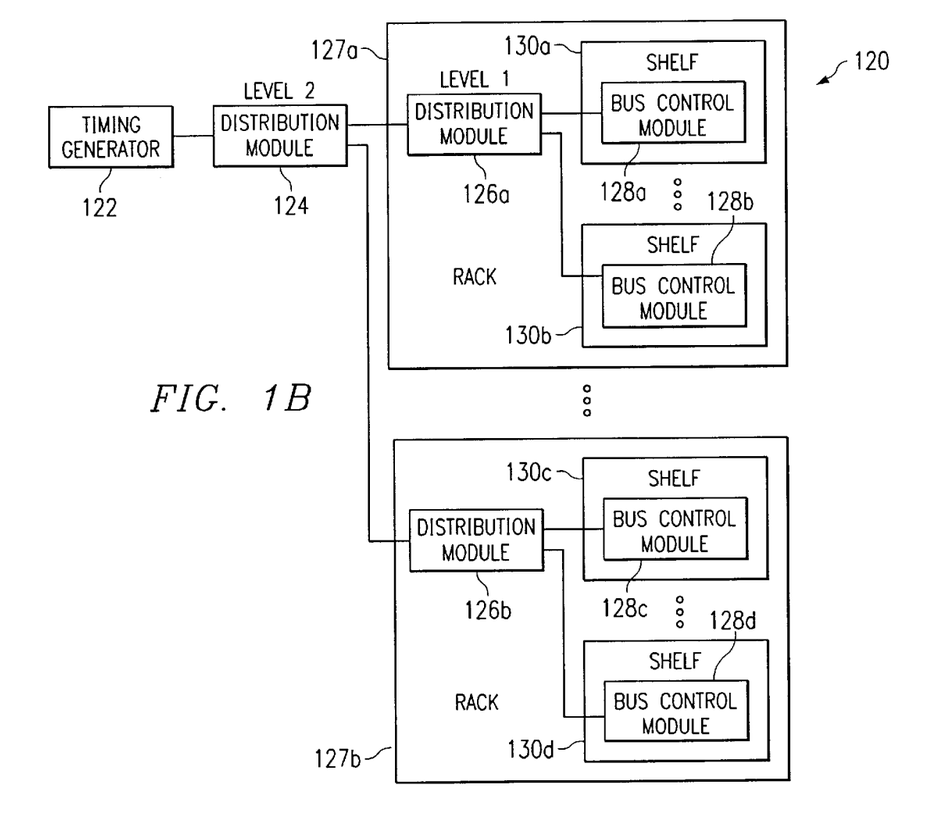
FIG. 1B is a block diagram of one embodiment of a two-level system for distributing a timing signal according to the present invention.

FIG. 1B is a block diagram of one embodiment of a two-level system 120 for distributing a timing signal according to the present invention. System 120 includes a timing generator 122, distribution modules 124 and 126a–b, bus control modules 128a–d, and shelves 130a–d, which operate in a manner similar to that of the modules of system 100.

In one embodiment, timing generator 122 generates timing and control signals for distribution through system 120 in a framed signal. Hence, downstream modules of system 120 do not require the complicated hardware and software needed to perform this operation. Timing generator 122 sends the framed signal to distribution module 124, which in turn sends the signals to distribution modules 126a–b of racks 127a–b, respectively. Distribution modules 126a–b send the signals to bus control modules 128a–d, which in turn distribute the signals to shelves 130a–d, respectively.

Bus control modules 128a–d receive derived clock signals and status signals from shelves 130a–d. Bus control modules 128a–d send these signals to distribution modules 126a–b, which in turn send the signals to distribution module 124. Distribution module 124 then sends the derived clock and status signals to timing generator 122. Timing generator 122 may select one of the derived clock signals received from bus control modules 128a–b as a timing signal to distribute through system 120.

Figure 2A:
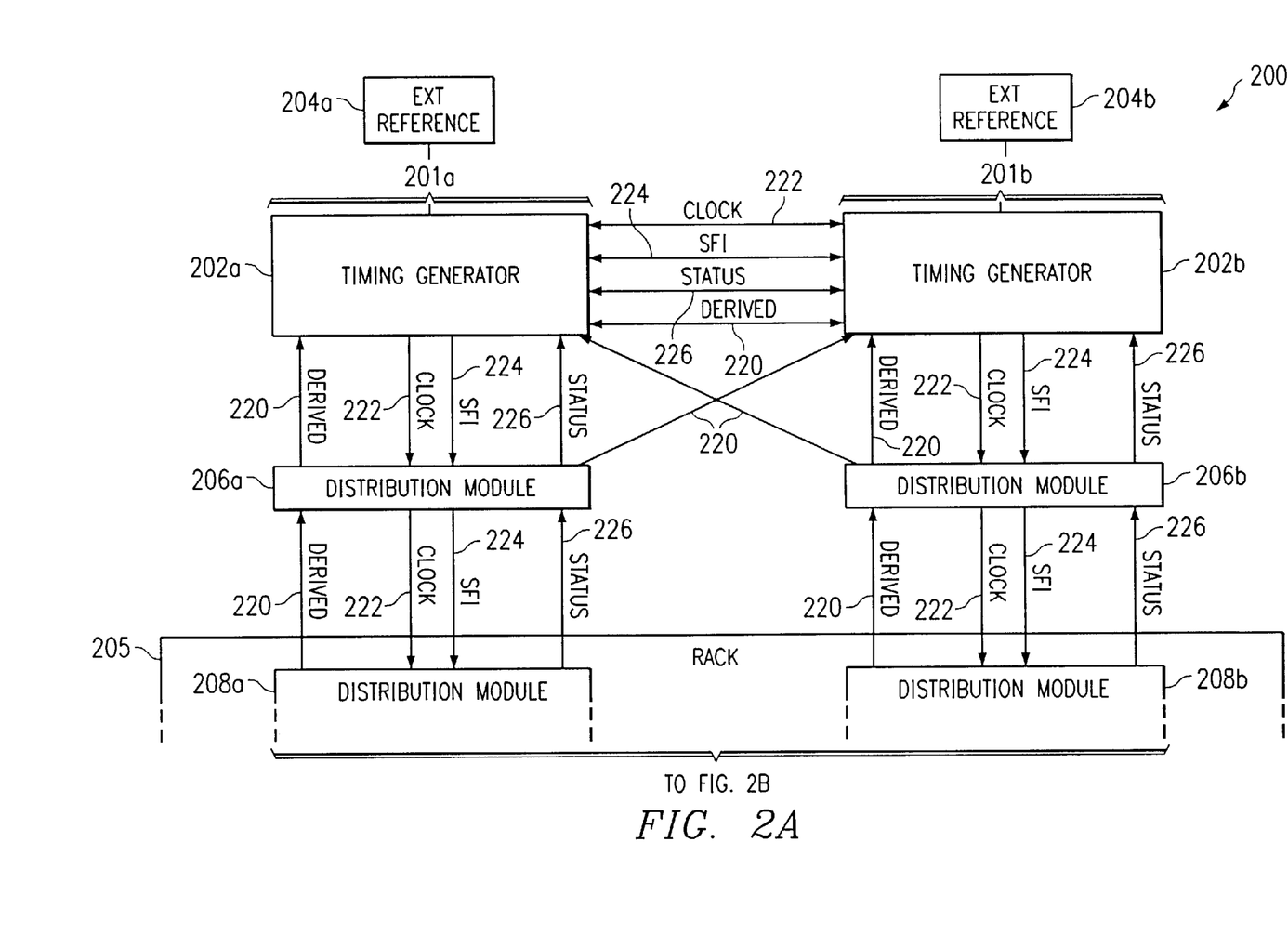
FIGS. 2A and 2B are block diagrams of one embodiment of a system for distributing a timing signal according to the present invention.
Figure 2B:
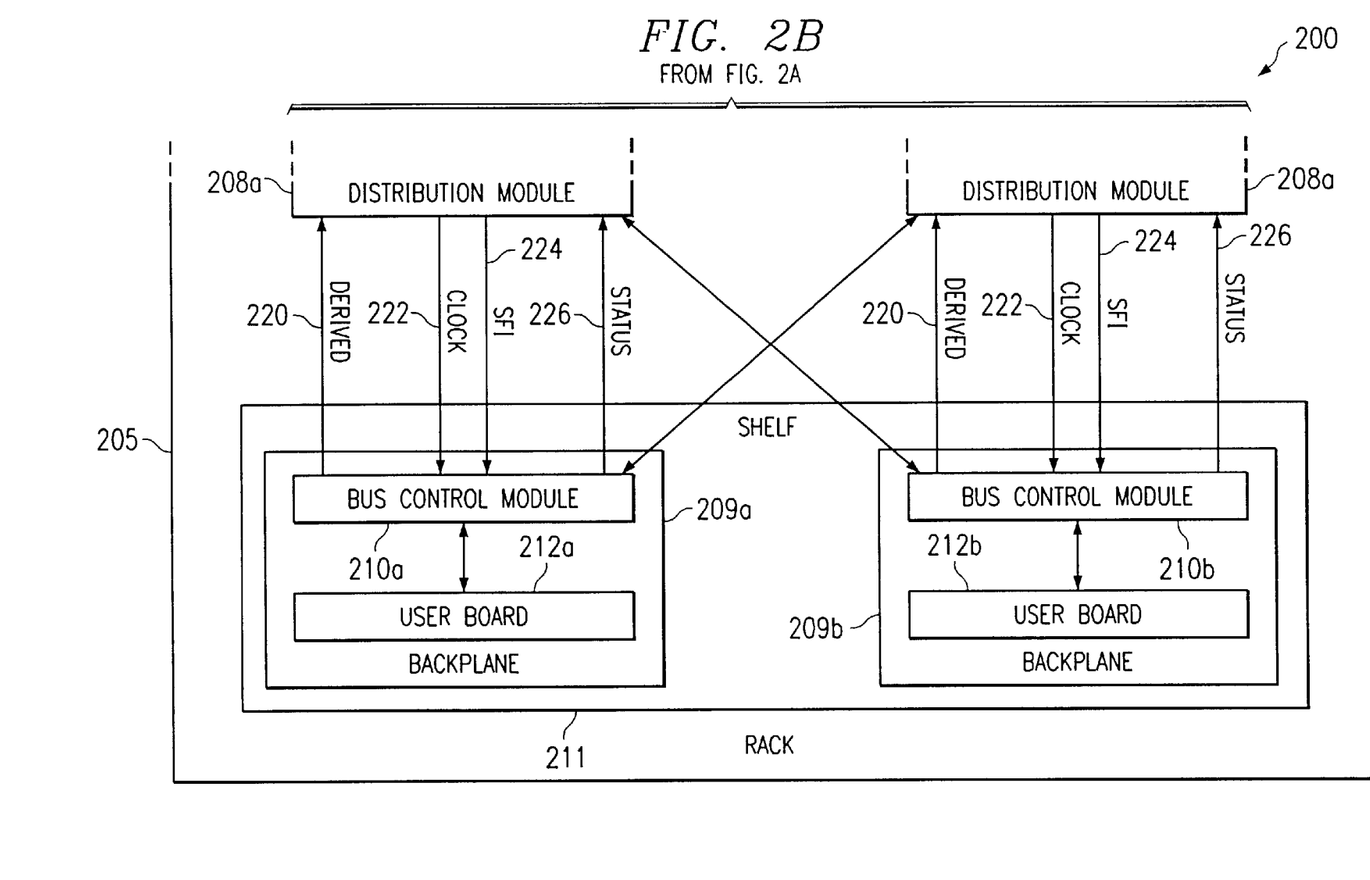

FIGS. 2A and 2B are block diagrams of one embodiment of a system 200 for distributing a timing signal according to the present invention. In one embodiment, timing generators generate timing and control signals for distribution through a telecommunication system in a framed signal. The timing generators send the framed signal to the distribution modules, which send the signal to the bus control modules, which distribute the signal to the shelves of the system. Additionally, the timing generators receive signals from the system that include status signals and derived clock signals. The timing generators may select a derived clock signal as a timing signal to distribute through the system.

Referring to FIGS. 2A and 2B, according to one embodiment, system 200 comprises redundant planes 201a–b of modules for distributing a timing signal. Each plane 201a–b is operable to distribute a timing signal, and serves as a backup in the event of the failure of the other plane. System 200 may have more or fewer redundant planes. System 200 may use a compact peripheral component interface (compact PCI or CPCI) packaging technique for racks, shelves, and backplanes. The technique allows for common use of a PCI bus, a standardized communications path.

In one embodiment, timing generator 202a receives external signals from an external reference 204a. External reference 204a may comprise, for example, a DS1/E1 signal, sine wave input, derived timing signal, or composite clock signal. External reference 204a may be input using a twisted pair or a coaxial cable. Timing generator 202a may comprise, for example, a compact PCI compatible timing card located in an administration shelf of system 200. Timing generator 202a may also comprise, for example, an onboard system synchronizer circuit that meets Stratum 3 requirements for jitter, wander, free run accuracy, and holdover. The circuit of timing generator 202a may implement frequency-locking of the time base to an external synchronization signal. One embodiment of timing generator 202a is described in more detail in connection with FIG. 3.

Timing generator 202a uses external reference 204a to generate control and timing signals for distribution through plane 201a. Since timing generator 202a performs these operations, downstream modules such as distribution modules 206a–208a and bus control module 210a do not need the complicated hardware and software to perform these operations. This simplifies the hardware and software design of system 200, resulting in increased efficiency and reduced costs.

Timing generator 202a communicates a clock signal 222 and a framed signal, for example, a super frame indicator (SFI) signal 224, to timing generator 202b of plane 201b and to distribution module 206a. Clock signal 222 comprises, for example, a 19.44 Hz system clock signal. SFI signal 224 includes timing and control signals, and distributes timing and control information addressed to individual modules of system 200. SFI signal 224 comprises timeslots, where each timeslot is assigned to a module. Each timeslot has a header, which may comprise a six-bit synchronization word. In order to provide synchronization, bits of the timeslot excluding the header may be repeated twice, so a module receiving SFI signal 224 may synchronize itself by evaluating the synchronization word of SFI signal 224. SFI signal 224 may include a phase of a timing signal, for example, a composite clock signal.

SFI signal 224 may include a signal selection command that instructs each module to select a specific derived clock signal from the signals received from downstream modules and to send the selected derived clock signal upstream. Timing generator 202a may determine the derived clock signal to be selected as the highest quality signal, determined from the status information received from a status signal 226. Timing generator 202a may use the selected signal as a timing signal to distribute through the system. To select a different derived clock signal, timing generator 202a sends the change through SFI signal 224, instead of changing any cables.

The control signals may comprise information directing the operation of system 200, for example, instructions for which plane 201a–201b to use. The control signals may also include, for example, time-of-day, reset commands, alarms, frame indicators, tones, and/or announcements. Including these functions in the control signals may reduce the complexity of the modules and paths needed to provide these functions.

In one embodiment, timing generator 202a may be configured to work in a master-slave mode with timing generator 202b to minimize the skew between the corresponding timing signals generated by timing generators 202a–b. Timing generator 202b may perform in a manner similar to that of timing generator 202a.

In one embodiment, distribution modules 206a–b and 208a–b may comprise, for example, circuit cards of rack 205 that distribute signals to and receive signals from other distribution modules or shelves. Rack 205 may comprise, for example, an European Telecommunications Standards Institute (ETSI) rack with integrated lighting and cable troughs. Distribution module 206a and 208a may be located in an administration shelf of system 200 near a power supply unit for system 200. Distribution modules 206a and 208a may use a field programmable gate array (FPGA) to, for example, monitor signals, align signals, extract data from signals, discard defective information, and report problems using the status signal. An example of a field programmable gate array may comprise a Xilinx 4028XLA SRAM-based field programmable gate array in a 240-pin PQSP package. Distribution module 206a receives clock 222 and SFI 224 signals from timing generator 202a and sends signals 222 and 224 to distribution module 208a of rack 205. Distribution module 208a sends clock 222 and SFI 224 signals to shelf 211. Distribution modules 206b and 208b may perform in a manner similar to that of distribution modules 206a and 208a.

System 200 may have more or fewer distribution modules. A system with one rack, for example, system 100 of FIG. 1A, may require a single distribution module pair of rack distribution modules. A system with two to eight racks, for example, system 120 of FIG. 1B, may require two levels of distribution module pairs a pair of leading and a pair of rack distribution modules. A system with nine to ninety-six racks may require three levels of distribution module pairs: a pair of leading, a pair of central, and a pair of rack distribution modules. A system with more than ninety-six racks may require distribution modules with more ports.

According to one embodiment, distribution modules 208a and 208b transmit clock 222 and SFI 224 signals to bus control modules 210a–b of backplanes 209a–b of a shelf 211. Shelf 211 may have more or fewer bus control modules and may be designed to hold more or fewer backplanes 209a–b. Backplane 209a serves as a backplane for bus control module 210a and user board 212a, and may provide support for total power consumption, for example, 450 watts. Bus control module 210a may comprise, for example, a bus control card that distributes timing and other signals to shelf 211 in conjunction with bus control module 210b. Bus control module 210a receives pairs of clock and SFI signals 222 and 224, respectively, from distribution modules 208a and 208b. Bus control module 210a aligns the signals, selects the highest quality signal from each pair of signals using a selector, and distributes the selected signals to a user board 212a. Bus control module 210b may operate in a similar fashion. User board 212a may comprise a CPCI user board that fits a CPCI card slot and performs a common application. User board 212b may operate in a similar fashion.

Bus control module 210a also receives derived clock 220 and status 226 signals from user board 212a. Derived clock signal 220 may include, for example, an 8 kHz derived clock signal from a network interface. Status signal 226 includes status information collected from shelf 211. Status information may include power supply, correct hardware/software configuration, correct selection of the data and timing planes, a data parity error, a timing signal defect, and/or an application-specific error. Status signal 220 collects status information as it travels upstream through the modules. Modules may insert status information into multiplexed timeslots within status signal 220, where one timeslot is associated with one module.

A status generator of bus control module 210a monitors the status of input signals and downstream modules and reports the status information on output status signals 226. A selector of bus control module 210a selects the derived clock signal 220 specified by SFI signal 224, and sends signal 220 to distribution modules 208a–b. Bus control module 210b may perform in a manner similar to that of bus control module 210a.

Distribution module 208a then receives derived clock 220 and status 226 signals from shelf 211. Distribution module 208a inserts status information into status signal 226, and selects the derived clock signal 220 specified by SFI signal 224. Distribution module 208a transmits signals 220 and 226 to distribution module 206a. Distribution module 206b operates in a manner similar to that of distribution module 208a and transmits signals 220 and 226 to timing generator 202a. Control pins may be used to define the transceivers that receive the signals.

Timing generator 202a receives derived clock signal 220 and status signal 226 from distribution module 206a and timing generator 202b. Timing generator 202a may select derived clock signal 220 as a timing signal to distribute through plane 201a using SFI signal 224. Status signal 226 includes status information collected from shelf 211, bus control modules 210a–b and distribution modules 206a–b and 208a–b. Timing generator 202a may implement corrective action in response to the status signal.

Figure 3:
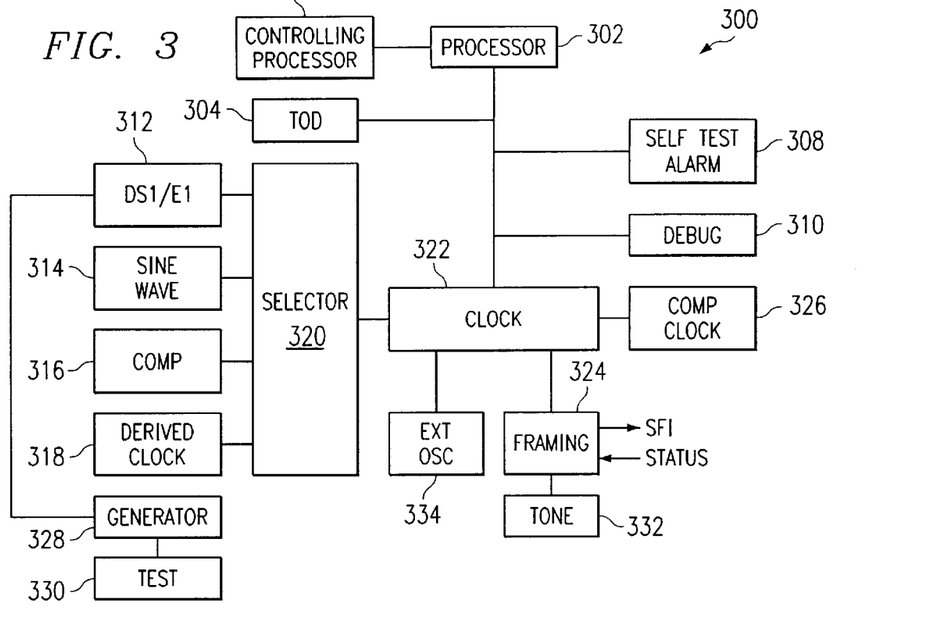
FIG. 3 is a block diagram of one embodiment of a system for generating a timing signal according to the present invention.

FIG. 3 is a block diagram of one embodiment of a system for generating a timing signal according to the present invention. In one embodiment, the system comprises a timing generator 300 that selects an external signal as a timing signal and distributes the timing signal in an SFI signal by inserting the phase of the timing signal in the SFI signal. Timing generator 300 also receives status information through a status signal and implements corrective action if needed. Additionally, timing generator 300 receives a derived clock signal, and may select the derived clock signal as a timing signal. Since timing generator 300 performs these operations, downstream modules do not require the complicated hardware and software needed to perform these operations, resulting in increased efficiency and reduced costs.

Referring to FIG. 3, according to one embodiment, timing generator 300 comprises modules coupled together as shown in FIG. 3. A processor 302 controls the operation of timing generator 300, and may comprise, for example, a Motorola MPC860 processor with a core clock rate of 50 MHz. Processor 302 receives instructions from a controlling processor 301 and then carries out the instructions. For example, controlling processor 301 may instruct processor 302 to initiate a particular software configuration. Controlling processor 301 may be used to communicate with an operator, for example, to receive an initial time of day setting from the operator, and may comprise a PCI bus interface. Processor 302 also generates selection commands instructing timing generator 300 to select a particular signal as a timing signal to be distributed through a telecommunication system.

In one embodiment, timing generator may include two cards, a transition module card and a processor card. The transition module card receives and transmits signals, and processor card generates and processes the signals. Timing generator 300 may include several ports. A time of day (TOD) port 304 may comprise, for example, an RS-232 serial communications port for receiving the time of day from an external device, for example, a global positioning system provided synchronization signal. A self test/alarm circuit 308 may be used by an external device to collect information to check the proper operation of timing generator 300. A debug port 310 may comprise, for example, a serial communications port used by an external device with an Ethernet transceiver and RS-232 ports to check the programming of timing generator 300. Signals may be communicated between items 308–310 and processor 302 and a clock 322.

In one embodiment, timing generator 300 may receive and monitor external signals from one or more ports. Each port may monitor the status of input signals, and may report a detected problem to the processor 302. A DS1/E1 port 312 may receive a DS1 or an E1 signal. The signal may be monitored, for example, for loss of signal, alarm indications, frequency, and/or synchronization messages. A sine wave port 314 may receive a sine wave signal. The sine wave may be restricted to a frequency between 1–5 MHz that is divisible by 8 kHz, and may be divided down to 8 kHz before transmittal to clock 322. The sine wave may also be monitored for an absence of transition on the sine wave. A composite clock port 316 may receive composite clock signals for use by, for example, functions operating on DS0 data. The composite clock signal may be monitored, for example, for loss of signal and/or frequency. A derived clock port 318 may receive derived clock signals from network interfaces. The derived clock signal may be monitored, for example, for loss of activity or for frequency.

According to one embodiment, selector 320 selects signals to send to clock 322, one for plane 201a and one for plane 201b. Software may be used to control the selection of the signal. Clock 322 may comprise, for example, a Stratum 3 clock. Clock 322 monitors the selected signal for errors. If there are defects in the selected signal, clock 322 reports the defects to processor 302. If there are no defects, clock 322 uses the selected signal as a timing signal. Clock 322 sends the timing signal to a framing module 324. Framing module 324 inserts the phase of the timing signal into the SFI signal, and monitors the status information on the status signal.

In one embodiment, timing generator 300 may include other outputs for monitoring the operation of timing generator 300 or for providing timing signals to external devices. Clock 322 may send the timing signal to a composite clock output 326 for use by an external device. A generator 328 may receive signals from DS1/E1 port 312 or from derived clock port 318. Generator 328 may regenerate a received signal, extract and insert information from the received signal, and send the received signal to test output 330. An external device may use the signal from test output 330 to test the derived clock signal without disturbing clock 322. Additionally, the signal from test output 330 may be used as a timing signal for an external device. Timing generator 300 may include ports to provide additional features. A tone bus port 332 may be used to receive prefabricated tone signals to send to framing module 324, which framing module 324 may insert into an SFI signal. An external oscillator port 334 may be used to transmit a signal from an external oscillator to clock 322.

Figure 4:
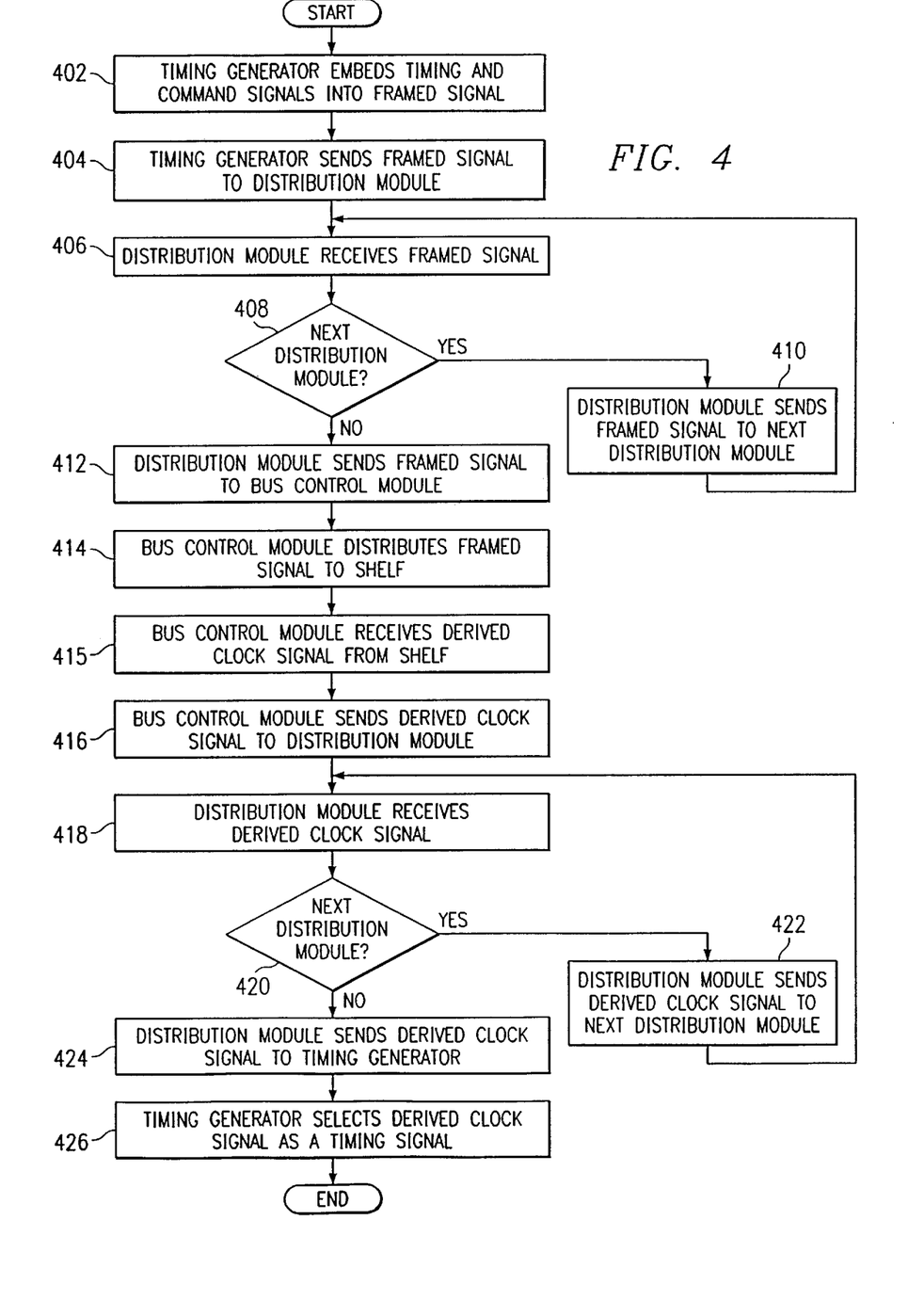
FIG. 4 is a flowchart illustrating one embodiment of a method for distributing a timing signal according to the present invention.

FIG. 4 is a flowchart illustrating one embodiment of a method for distributing a timing signal according to the present invention. Referring to FIG. 4, the method begins at step 402, where timing generator 202a embeds a phase of a timing and control signals into a framed signal, for example, SFI signal 224. Timing generator 202a generates the timing and control signals, so downstream modules do not require the complicated hardware and software needed to perform these operations, resulting in increased efficiency and reduced costs. At step 404, timing generator 202a sends clock 222 and SFI 224 signals to distribution module 206a and to timing generator 202b. SFI signal 224 instructs each downstream module to select a specific derived clock signal 220. At step 406, distribution module 206a receives clock 222 and SFI 224 signals.

If there is another distribution module at step 408, the method moves to step 410, where distribution module 206a sends signals 222 and 224 to the next distribution module 208a. If there are no other distribution modules at step 408, the method moves to step 412, where distribution module 208a sends clock 222 and SFI 224 signals to bus control modules 210a–b of shelf 211. At step 414, bus control modules 210a–b select the highest quality signals 222 and 224 and distribute signals 222 and 224 to shelf 211. At step 415, bus control modules 210a–b receive status 226 and derived clock 220 signals from shelf 211. Bus control modules 210a–b select the derived clock signal 220 specified by SFI signal 224. At step 416, bus control modules 210a–b send signals 220 and 226 to distribution modules 208a–b. At step 418, distribution module 208a receives signals 220 and 226, and selects the derived clock signal 220 specified by SFI signal 224.

If there is another distribution module at step 420, the method moves to step 422, where distribution module 208a sends signals 220 and 226 to distribution module 206a, which selects the derived clock signal 220 specified by SFI signal 224. If there are no other distribution modules at step 420, the method moves to step 424, where distribution module 206a sends signals 220 and 226 to timing generator 202a. At step 426, timing generator 202a selects a derived clock signal 220 as a timing signal for distribution, and the method terminates.

Figure 5:
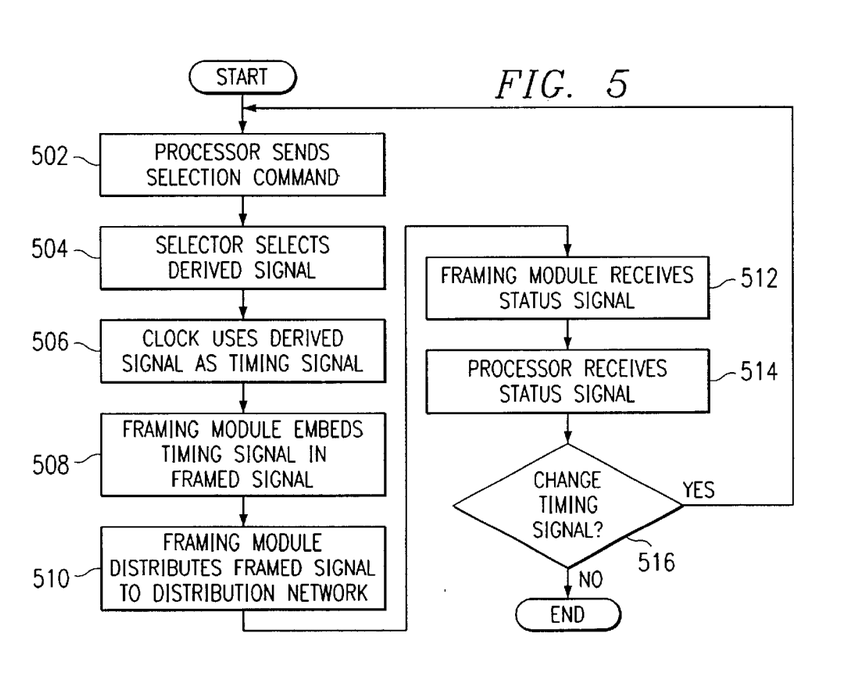
FIG. 5 is a flowchart illustrating one embodiment of a method for generating a timing signal according to the present invention.

FIG. 5 is a flowchart illustrating one embodiment of a method for generating a timing signal according to the present invention. The method begins at step 502, where processor 302 of timing generator 300 sends instructions to selector 320 and clock 322. Instructions include a selection command stating which signal to select as a timing signal. At step 504, selector 320 selects a derived clock signal as a timing signal in response to the selection command. Selector 320 sends the selected signal to clock 322. At step 506, clock 322 uses the derived clock signal as a timing signal, and sends the timing signal to framing module 324. At step 508, framing module 324 embeds the phase of the timing signal into framed signal, for example, an SFI signal. At step 510, framing module 324 distributes the framed signal to a telecommunication system.

At step 512, framing module 324 receives a status signal, which includes status information about the timing signal, and sends the signal to processor 302. At step 514, processor 302 receives the status signal. If another derived clock signal is to be selected at step 516, the method moves to step 502 where processor 302 sends another selection command. The selection command changes the timing signal to another derived signal. If the selection of the timing signal is to remain the same at step 516, the method terminates.

A technical advantage of the present invention is that a timing generator generates timing and control signals for distribution to the telecommunication system. Since the timing generator performs these operations, downstream modules do not require the complicated hardware and software needed to perform these operations. Another technical advantage of the present invention is that the timing signal is distributed with control signals in a framed signal. Sending the timing signals with the control signals reduces the amount of hardware and software needed to distribute timing signal through the telecommunication system. Consequently, the present invention results in more efficient and effective distribution of a timing signal in a telecommunication system.

Although an embodiment of the invention and its advantages are described in detail, a person skilled in the art could make various alternations, additions, and omissions without departing from the spirit and scope of the present invention as defined by the appended claims.

What is claimed is:

1. A system for generating a timing signal, the system comprising:
   a processor operable to generate a selection command;
   a clock operable to receive a signal selected in response to the selection command and to convert the selected signal to a timing signal; and
   a framing module operable to insert a phase of the timing signal into a framed signal.

2. The system of claim 1, further comprising a selector operable to receive the selection command and to select the selected signal in response to the selection command.

3. The system of claim 1, further comprising a port operable to receive a signal and to monitor a status of the signal, the signal operable to be selected as the selected signal.

4. The system of claim 1, wherein the framed signal comprises a signal selection command operable to select a derived clock signal.

5. The system of claim 1, further comprising a sine wave port operable to receive a sine wave signal, the sine wave signal operable to be selected as the selected signal.

6. The system of claim 1, further comprising a composite clock port operable to receive a composite clock signal, the composite clock signal operable to be selected as the selected signal.

7. The system of claim 1, further comprising a derived clock port operable to receive a derived clock signal, the derived clock signal operable to be selected as the selected signal.

8. The system of claim 1, wherein the framing module is operable to receive a status signal comprising status information.

9. The system of claim 8, wherein the processor is operable to receive the status signal and to generate a new selection command in response to the status signal.

10. The system of claim 1, further comprising a test output operable to transmit timing signal for an external device.

11. The system of claim 1, further comprising a test output operable to output a test signal, the test signal operable to be used to test the system.

12. The system of claim 1, further comprising a tone bus port operable to receive a tone signal and to send the tone signal to the framing module.

13. The system of claim 1, wherein the clock comprises a stratum three clock.

14. The system of claim 1, wherein the processor is operable to receive an instruction from a control module.

15. The system of claim 1, wherein the processor is operable to generate a control signal, and the framing module is operable to insert the control signal into the framed signal.

16. A method for generating a timing signal for a telecommunication system, the method comprising:
   generating a selection command using a processor;
   selecting a signal in response to the selection command;
   converting the selected signal to a timing signal using a clock; and
   inserting a phase of the timing signal into a framed signal using a framing module.

17. The method of claim 16, wherein the step of selecting further comprises selecting the signal in response to the selection command using a selector.

18. The method of claim 16, wherein the framed signal comprises a signal selection command operable to select a derived clock signal.

19. The method of claim 16, further comprising receiving a sine wave signal, and selecting the sine wave signal as the selected signal.

20. The method of claim 16, further comprising receiving a composite clock signal, and selecting the composite clock signal asthe selected signal.

21. The method of claim 16, further comprising receiving a derived clock signal, and selecting the derived clock signal as the selected signal.

22. The method of claim 16, further comprising receiving a status signal comprising status information, and generating a new selection command in response to the status signal.

23. The method of claim 16, further comprising distributing the framed signal through a telecommunication system.

24. The method of claim 16, further comprising outputting a timing signal for an external device.

25. The method of claim 16, further comprising outputting a test signal, the test signal operable to be used to test the timing signal.

26. The method of claim 16, further comprising:
   receiving a tone signal;
   sending the tone signal to the framing module; and
   inserting the tone signal into the framed signal.

27. The method of claim 16, further comprising transmitting an instruction from a control module to the processor.

28. The method of claim 16, further comprising:
   generating a control signal; and
   inserting the control signal into the framed signal.

* * * * *